United States Patent
Fan et al.

(10) Patent No.: US 12,348,043 B2
(45) Date of Patent: Jul. 1, 2025

(54) METHOD AND APPARATUS FOR ALLOCATING VIRTUAL INERTIA IN PHOTOVOLTAIC CLUSTER

(71) Applicants: State Grid Hebei Electric Power Co., Ltd. Research Institute, Hebei (CN); State Grid Hebei Electric Power Co., Ltd., Hebei (CN); State Grid Corporation of China, Beijing (CN)

(72) Inventors: Hui Fan, Hebei (CN); Jifeng Liang, Hebei (CN); Peng Luo, Hebei (CN); Tiecheng Li, Hebei (CN); Siming Zeng, Hebei (CN); Qian Zang, Hebei (CN); Leibao Wang, Hebei (CN)

(73) Assignees: State Grid Hebei Electric Power Co., Ltd. Research Institute, Shijiazhuang (CN); State Grid Hebei Electric Power Co., Ltd., Shijiazhuang (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 17/782,999

(22) PCT Filed: Mar. 28, 2022

(86) PCT No.: PCT/CN2022/083271
§ 371 (c)(1),
(2) Date: Jun. 7, 2022

(87) PCT Pub. No.: WO2023/178707
PCT Pub. Date: Sep. 28, 2023

(65) Prior Publication Data
US 2024/0186794 A1    Jun. 6, 2024

(30) Foreign Application Priority Data
Mar. 23, 2022  (CN) .......................... 202210291076.9

(51) Int. Cl.
*H02J 3/38* (2006.01)
*H02J 3/28* (2006.01)

(52) U.S. Cl.
CPC ................ *H02J 3/381* (2013.01); *H02J 3/28* (2013.01); *H02J 2203/20* (2020.01); *H02J 2300/24* (2020.01)

(58) Field of Classification Search
CPC .......... H02J 3/381; H02J 3/28; H02J 2203/20; H02J 2300/24; H02J 3/00; H02J 3/38; H02J 3/241; H02J 3/46; Y02E 70/30
See application file for complete search history.

(56) References Cited

U.S. PATENT DOCUMENTS

2020/0144946 A1*  5/2020  Huang ...................... H02J 3/46

FOREIGN PATENT DOCUMENTS

| CN | 111799844 A | * 10/2020 | ................ H02J 3/28 |
| CN | 113964883 A | * 1/2022 | |

* cited by examiner

*Primary Examiner* — Zhipeng Wang

(57) ABSTRACT

The method includes: determining required virtual inertia based on a frequency change rate monitored at a grid connection point of a photovoltaic grid-connected system; obtaining values of indexes that affect virtual inertia provided by each virtual synchronous generator (VSG) control unit in a photovoltaic cluster of the photovoltaic grid-connected system; determining, by using a predetermined function equation, a function value corresponding to each index; and determining an allocation proportion of the required virtual inertia in each VSG control unit based on the function value corresponding to each index. A problem of difficult conversion between a plurality of kinds of performance during operation of a power system is resolved, the frequency change rate is suppressed to a certain extent, and a stable state is recovered quickly.

14 Claims, 2 Drawing Sheets

METHOD AND APPARATUS FOR ALLOCATING VIRTUAL INERTIA IN PHOTOVOLTAIC CLUSTER

TECHNICAL FIELD

Embodiments of the present disclosure generally relate to the field of photovoltaic power generation, and more specifically, to a method and apparatus for allocating virtual inertia in a photovoltaic cluster.

BACKGROUND

The installed capacity of renewable power generation in China had reached 934 million KW by the end of 2020, with a year-on-year increase of about 17.5%. The installed capacity of wind power is 281 million KW and the installed capacity of photovoltaic power generation is 253 million KW. Therefore, the large-scale development of photovoltaic power generation has become an irresistible trend.

Photovoltaic power generation mainly relies on power electronic devices to send absorbed energy to a power grid. However, when a sudden load change occurs, the power electronic devices do not support inertia control like a traditional generator, which results in a significant and rapid frequency change and even affects stability of a power system. Therefore, some scholars have proposed virtual synchronous generator (VSG) control to simulate an inertia characteristic of the traditional generator when the sudden load change occurs, provide virtual inertia for the system, and ensure that the frequency of power system can quickly return to a stable state.

Most of existing researches on VSG control focus on characteristics and inertia allocation of VSG control. However, with the gradual expansion of the photovoltaic market and the increasing scale of photovoltaic power generation, a single VSG control unit is not enough to maintain safety and stability of a large-scale photovoltaic grid-connected system. Therefore, a plurality of VSG control units need to coordinate and cooperate with each other to ensure overall stable operation. In a photovoltaic grid-connected system controlled by a plurality of VSG control units, how to allocate virtual inertia provided by each unit has become an urgent problem to be resolved.

SUMMARY

According to embodiments of the present disclosure, a method for allocating virtual inertia in a photovoltaic cluster is provided, which can convert an objective function with different dimensions and different satisfaction degrees into an objective function with a same dimension and a same satisfaction degree. In this way, a problem of difficult conversion between a plurality of kinds of performance during operation of a power system is resolved, consideration is given to a plurality of targets of inertia allocation, a frequency change rate is suppressed to a certain extent, and a stable state is recovered quickly. The method is simple and practical.

According to a first aspect of the present disclosure, a method for allocating virtual inertia in a photovoltaic cluster is provided, including:

determining required virtual inertia based on a frequency change rate monitored at a grid connection point of a photovoltaic grid-connected system;

obtaining values of indexes that affect virtual inertia provided by each virtual synchronous generator (VSG) control unit in a photovoltaic cluster of the photovoltaic grid-connected system;

determining, by using a predetermined function equation, a function value corresponding to each index, where the function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter; and determining an allocation proportion of the required virtual inertia in each VSG control unit based on the function value corresponding to each index.

In some embodiments, the obtaining values of indexes that affect virtual inertia provided by each VSG control unit in a photovoltaic cluster of the photovoltaic grid-connected system includes:

obtaining a residual energy storage capacity of a super-capacitor, rated power of a converter, and adjustable charge and discharge power of an energy storage device for a photovoltaic unit corresponding to each VSG control unit in the photovoltaic cluster of the photovoltaic grid-connected system.

In some embodiments, the step of determining, by using a predetermined function equation, a function value corresponding to each index includes:

determining, by using the following function equation, the function value corresponding to each index:

$$u(x) = \begin{cases} p_{10}x^2 + q_{10}x + C_{10}, & a \leq x \leq b \\ 1, & b \leq x \leq c \\ p_{11}x^2 + q_{11}x + C_{11}, & c \leq x \leq d \end{cases}$$

where x represents the index; u(x) represents the function value; $p_{10}$, $q_{10}$, $C_{10}$, $p_{11}$, $q_{11}$, and $C_{11}$ represent determined parameters; and a, b, c, and d represent boundaries for dividing a working region of the energy storage device in a state of charge (SOC), where a section from a to b represents a discharging state of the energy storage device, a section from b to c represents a normal state of the energy storage device, and a section from c to d represents a charging state of the energy storage device.

In some embodiments, the step of determining an allocation proportion of the required virtual inertia in each VSG control unit based on the function value corresponding to each index includes: determining, based on a ratio of a sum of the function value corresponding to each index in each photovoltaic unit, an amount of the virtual inertia allocated to each VSG control unit.

In some embodiments, the method further includes:

presetting a threshold of the frequency change rate, and starting virtual inertia control when the frequency change rate exceeds the threshold.

In some embodiments, the step of determining required virtual inertia based on a frequency change rate of a photovoltaic grid-connected system includes:

determining the required virtual inertia by using the following function:

$$F = \begin{cases} k_1 e^{df/dt + k_2} + H_0 & |df/dt| \geq M \\ H_0 & |df/dt| < M \end{cases}$$

where $H_0$ represents a normal inertia value, M represents the threshold of the frequency change rate, $k_1$ and $k_2$ represent control parameters, and df/dt represents a frequency change rate value.

In some embodiments, a value of the residual energy storage capacity of the supercapacitor ranges from 10% to 90%.

According to a second aspect of the present disclosure, an apparatus for allocating virtual inertia in a photovoltaic cluster is provided, including:

a virtual inertia calculation module configured to determine required virtual inertia based on a frequency change rate monitored at a grid connection point of a photovoltaic grid-connected system;

an index value calculation module configured to obtain values of indexes that affect virtual inertia provided by each VSG control unit in a photovoltaic cluster of the photovoltaic grid-connected system;

an index function value calculation module configured to determine, by using a predetermined function equation, a function value corresponding to each index, where the function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter; and a virtual inertia allocation module configured to determine an allocation proportion of the required virtual inertia in each VSG control unit based on the function value corresponding to each index.

According to a third aspect of the present disclosure, an electronic device is provided, including a memory and a processor, where the memory stores a computer program, and the computer program is executed by the processor to implement the method described above.

According to a fourth aspect of the present disclosure, a computer-readable storage medium is provided, where the computer-readable storage medium stores a computer program, and the computer program is executed by a processor to implement the method described above.

The method for allocating virtual inertia in a photovoltaic cluster in the present disclosure resolves a problem of difficult conversion between a plurality of kinds of performance during operation of a power system, gives consideration to a plurality of targets of inertia allocation, suppresses the frequency change rate to a certain extent, and recovers a stable state quickly. The method is simple and practical.

The content described in this part is neither intended to limit key or important features of the embodiments of the present disclosure, nor intended to limit the scope of the present disclosure. Other features of the present disclosure will be easily understood based on the following description.

BRIEF DESCRIPTION OF THE DRAWINGS

The above and other features, advantages, and aspects of the embodiments of the present disclosure will become more apparent with reference to the accompanying drawings and the following detailed description. Same or similar reference numerals in the accompanying drawings indicate same or similar elements.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by those of ordinary skill in the art based on the embodiments of the present disclosure without creative efforts should fall within the protection scope of the present disclosure.

In addition, the term "and/or" used in this specification merely describes an association relationship between associated objects, and indicates that three types of relationships may exist. For example, A and/or B may indicate that A exists alone, both A and B exist, or B exists alone. In addition, the character "/" in this specification generally indicates that the associated objects are in an "or" relationship.

Figure 1:
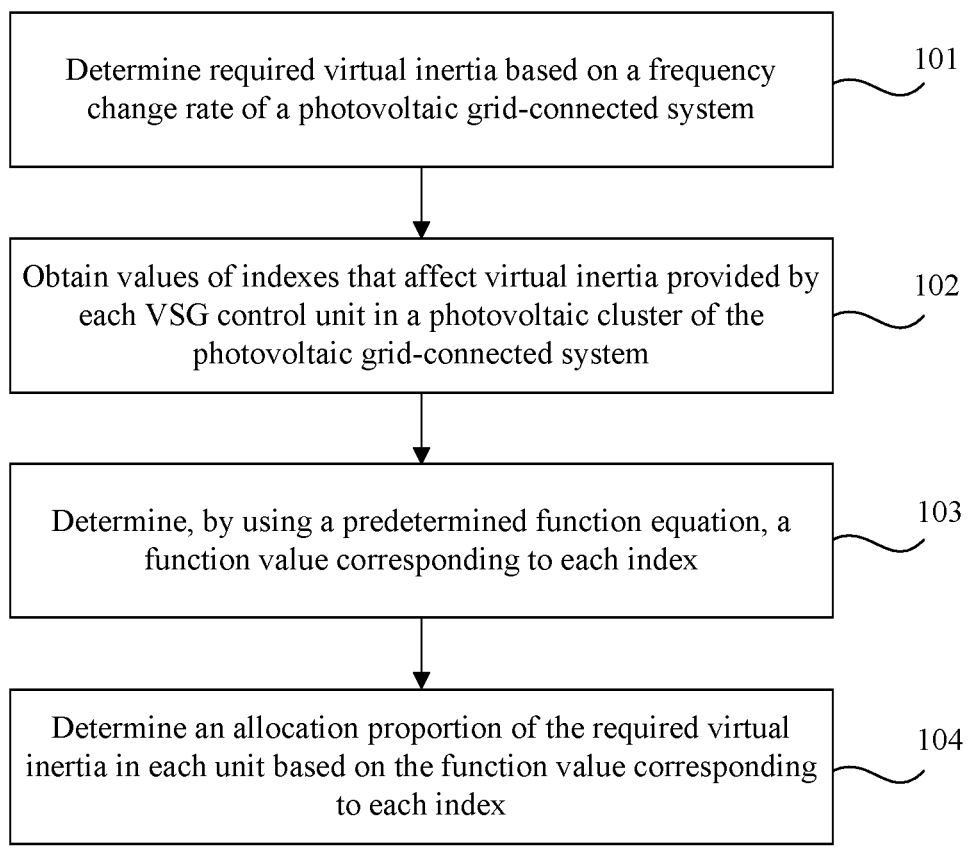
FIG. 1 is a flowchart of a method for allocating virtual inertia in a photovoltaic cluster according to Embodiment 1 of the present disclosure.

The technical solutions of the present disclosure will be described in detail below with reference to specific embodiments. FIG. 1 is a flowchart of a method for allocating virtual inertia in a photovoltaic cluster according to Embodiment 1 of the present disclosure. As shown in FIG. 1, the method for allocating virtual inertia in a photovoltaic cluster in this embodiment may include the following steps.

S101: Determine required virtual inertia based on a frequency change rate monitored at a grid connection point of a photovoltaic grid-connected system.

In a photovoltaic grid-connected system controlled by a plurality of VSG control units, a single VSG control unit is not enough to maintain safety and stability of the large-scale photovoltaic grid-connected system, a plurality of VSG control units need to coordinate and cooperate with each other to ensure the stable operation of the photovoltaic grid-connected system. In the photovoltaic grid-connected system, charge output frequencies of a photovoltaic power supply and an energy storage device are unstable and change in real time, which causes instability of the photovoltaic grid-connected system. In this embodiment of the present disclosure, the VSG control units coordinate and cooperate with each other to ensure the overall stable operation. That is, corresponding virtual inertia is allocated to different VSG control units to make the photovoltaic grid-connected system stable.

Firstly, the required virtual inertia needs to be determined based on the overall frequency change rate of the photovoltaic grid-connected system. The virtual inertia can achieve an effect similar to a synchronous generator by combining an inverter and a corresponding control algorithm. For how to determine the required virtual inertia, reference may be made to the method involved in subsequent embodiments of the present disclosure, and details are not provided in this embodiment.

S102: Obtain values of indexes that affect virtual inertia provided by each VSG control unit in a photovoltaic cluster of the photovoltaic grid-connected system.

In this embodiment, since the photovoltaic grid-connected system usually includes the plurality of VSG control units, and different virtual inertia needs to be allocated to each VSG control unit, virtual inertia that needs to be allocated to each VSG control unit needs to be determined. Specifically, the values corresponding to the indexes affecting the virtual inertia that needs to be provided by each unit can be obtained. In this embodiment, the obtaining values corresponding to indexes affecting virtual inertia that needs to be provided by each unit in a target photovoltaic cluster may be: obtaining a residual energy storage capacity of a supercapacitor, rated power of a converter, and adjustable charge and discharge power of an energy storage device for each photovoltaic unit in the target photovoltaic cluster. In a process of realizing the technical solutions of the present disclosure, the applicant found that the indexes affecting the virtual inertia that needs to be provided by each unit mainly include the residual energy storage capacity of the supercapacitor, the rated power of the converter, and the adjustable charge and discharge power of the energy storage device. Therefore, in this embodiment, corresponding virtual inertia is allocated to different VSG control units based on influence of each index on the virtual inertia.

In an optional implementation of this embodiment of the present disclosure, the following objective function is used to determine influence of the residual energy storage capacity of the supercapacitor, the rated power of the converter, and the adjustable charge and discharge power of the energy storage device on the virtual inertia that needs to be allocated to each VSG control unit:

$$F = \begin{cases} f[\min(SOC), \max(\Delta P_N), \max(\Delta P_t)], \, df/dt < 0 \\ f[\min(SOC), \max(\Delta P_N), \max(\Delta P_t)], \, df/dt > 0 \end{cases}$$

where F represents a value of the virtual inertia that needs to be allocated, SOC represents the residual energy storage capacity of the supercapacitor, $\Delta P_N$ represents the rated power of the converter, $\Delta P_t$ represents the adjustable charge and discharge power of the energy storage device, and df/dt represents a frequency change rate value.

Moreover, a function value corresponding to each index is determined by using the following predetermined function equation:

$$u(x) = \begin{cases} p_{10}x^2 + q_{10}x + C_{10}, \, a \leq x \leq b \\ 1, \, b \leq x \leq c \\ p_{11}x^2 + q_{11}x + C_{11}, \, c \leq x \leq d \end{cases}$$

where x represents the index; u(x) represents the function value; $p_{10}$, $q_{10}$, $C_{10}$, $p_{11}$, $q_{11}$, and $C_{11}$ represent determined parameters; and a, b, c, and d represent boundaries for dividing a working region of the energy storage device in a state of charge (SOC), wherein a section from a to b represents a discharging state of the energy storage device, a section from b to c represents a normal state of the energy storage device, and a section from c to d represents a charging state of the energy storage device. Values of a, b, c, and d need to be selected based on a specific situation.

The function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter.

Specifically, $p_{10}$, $q_{10}$, $C_{10}$, $p_{11}$, $q_{11}$, and $C_{11}$ in this embodiment can be determined by analyzing the small-signal model of the photovoltaic grid-connected system, selecting a six-terminal AC system as a modeling object, and performing root locus analysis on the parameters. Specifically, the six-terminal AC system can be divided into three modules: generator units, frequency modulation units, and a plurality of VSG control units, where the plurality of VSG control units include three independent VSG control units. A small-signal model is established for the above three modules separately. Based on the above, root locus analysis is performed to obtain influence of each function parameter (such as $p_{10}$, $q_{10}$, $C_{10}$, $p_{11}$, $q_{11}$, $C_{11}$) on system stability, and a parameter value is determined by comprehensively considering function vertexes, concavity and convexity, and the like.

In an optional embodiment of the present disclosure, the above function equation may be a membership function of virtual inertia corresponding to each index, and a value range of the membership function is [0, 1].

S103: Determine, by using the predetermined function equation, the function value corresponding to each index.

In this embodiment, the determined parameter value can be substituted into the function equation to determine the function value corresponding to each index.

S104: Determine an allocation proportion of the required virtual inertia in each unit based on a proportion of the function value corresponding to each index, so as to determine an amount of the virtual inertia that needs to be allocated to each unit in the target photovoltaic cluster.

In this embodiment, after the function value corresponding to each index is determined, the allocation proportion of the required virtual inertia in each VSG control unit can be determined based on a proportion of the function value corresponding to each index, so as to determine the amount of the virtual inertia that needs to be allocated to each VSG control unit in the target photovoltaic cluster.

Specifically, the amount of the virtual inertia allocated to each VSG control unit can be determined based on a ratio of a sum of the function value corresponding to each index in each VSG control unit. For example, the target photovoltaic cluster includes three VSG control units A, B and C, function values corresponding to indexes are A1, A2, and A3 for VSG control unit A, B1, B2, and B3 for VSG control unit B, and C1, C2, and C3 for VSG control unit C, and total virtual inertia is Q. In this case, virtual inertia allocated to VSG control unit A is (A1+A2+A3)/(A1+A2+A3+B1+B2+B3+C1+C2+C3)*Q. Virtual inertia allocated to VSG control unit B and VSG control unit C is also determined by referring to the above method.

The method for allocating virtual inertia in a photovoltaic cluster in the present disclosure resolves a problem of difficult conversion between a plurality of kinds of performance during operation of a power system, gives consideration to a plurality of targets of inertia allocation, suppresses the frequency change rate to a certain extent, and recovers a stable state quickly. The method is simple and practical.

In an optional embodiment of the present disclosure, in the above embodiments, a threshold of the frequency change rate of the system can further be preset, and virtual inertia control is started when the frequency change rate exceeds the threshold. Specifically, virtual inertia control may be performed by using the following function:

$$F = \begin{cases} k_1 e^{df/dt + k_2} + H_0 & |df/dt| \geq M \\ H_0 & |df/dt| < M \end{cases}$$

where $H_0$ represents a normal inertia value, M represents the threshold of the frequency change rate, and $k_1$ and $k_2$ represent control parameters.

In an optional embodiment of the present disclosure, in the above embodiments, a value of the residual energy storage capacity of the supercapacitor ranges from 10% to 90%.

It should be noted that, for the sake of simplicity, the foregoing method embodiments are described as a series of action combinations, but those skilled in the art will recognize that the present disclosure is not limited by the sequence of actions described, and certain steps may be carried out in another order or at the same time according to the present disclosure. In addition, it should be understood by those skilled in the art that the embodiments described in this specification are preferred embodiments and the involved actions and modules are not necessary for the present disclosure.

The above is the description of the method embodiment. The solutions of the present disclosure are further described below by using an apparatus embodiment.

Figure 2:
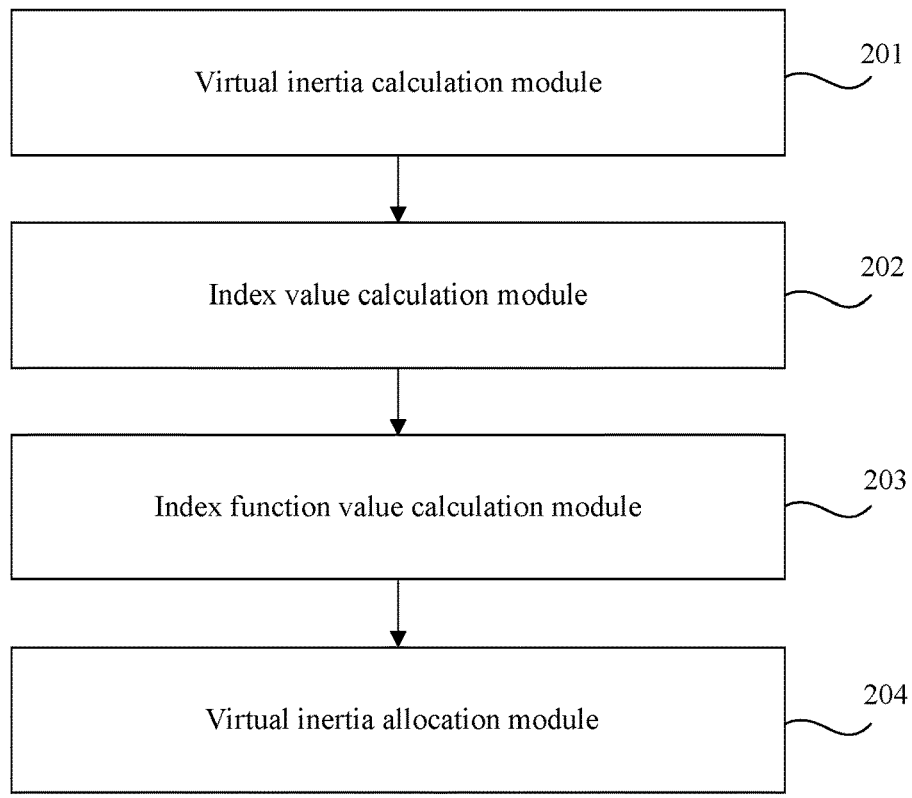
FIG. 2 is a schematic structural diagram of an apparatus for allocating virtual inertia in a photovoltaic cluster according to Embodiment 2 of the present disclosure.

FIG. 2 is a schematic structural diagram of an apparatus for allocating virtual inertia in a photovoltaic cluster according to Embodiment 2 of the present disclosure. The apparatus for allocating virtual inertia in a photovoltaic cluster in this embodiment includes:

- a virtual inertia calculation module 201 configured to determine required virtual inertia based on a frequency change rate monitored at a grid connection point of a photovoltaic grid-connected system;
- an index value calculation module 202 configured to obtain values of indexes that affect virtual inertia provided by each VSG control unit in a photovoltaic cluster of the photovoltaic grid-connected system;
- an index function value calculation module 203 configured to determine, by using a predetermined function equation, a function value corresponding to each index, where the function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter; and
- a virtual inertia allocation module 204 configured to determine an allocation proportion of the required virtual inertia in each VSG control unit based on the function value corresponding to each index.

In this embodiment of the present disclosure, the photovoltaic unit is a photovoltaic power generation apparatus known in the art. The VSG control unit may be one or more processors or chips that each have a communication interface and can realize a communication protocol. The controller or chip executes program-related code to realize a corresponding function. The virtual inertia calculation module 201, the index value calculation module 202, the index function value calculation module 203, and the virtual inertia allocation module 204 each may be one or more processors that each have a communication interface, can realize a communication protocol, and may further include a memory, a related interface and system transmission bus, and the like if necessary. The processor or chip executes program-related code to realize a corresponding function. Alternatively, the virtual inertia calculation module 201, the index value calculation module 202, the index function value calculation module 203, and the virtual inertia allocation module 204 share an integrated chip or share devices such as a processor or a controller and a memory. The shared processor, controller, or integrated chip executes program-related codes to implement a corresponding function.

A person skilled in the art can clearly understand that, for convenience and brevity of description, reference can be made to corresponding processes in the foregoing method embodiments for specific working processes of the above-described modules. Details are not described herein again.

Figure 3:
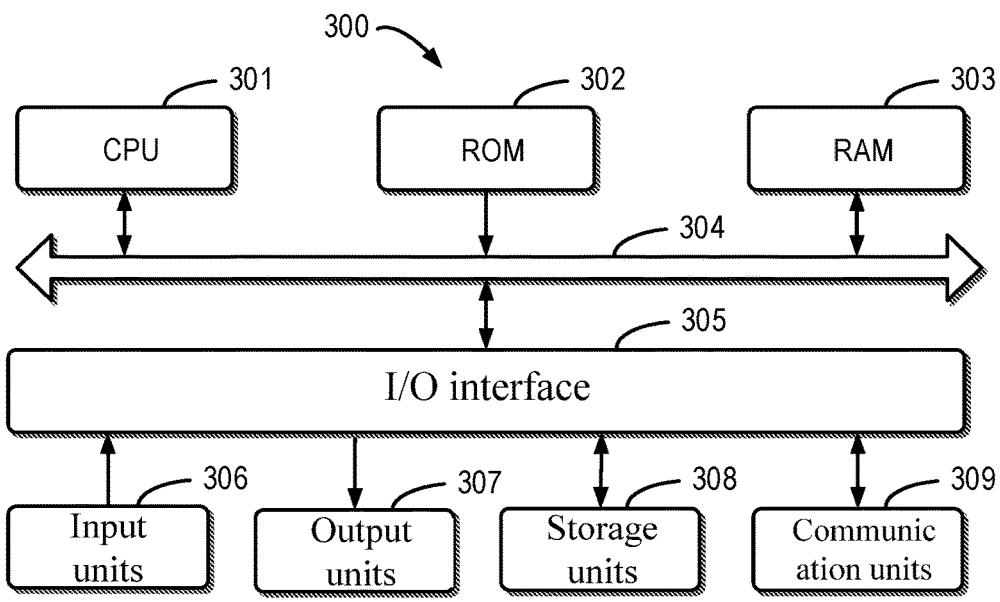
FIG. 3 is a schematic structural diagram of a device for allocating virtual inertia in a photovoltaic cluster according to Embodiment 3 of the present disclosure.

FIG. 3 is a schematic block diagram of an electronic device 300 that may be used to implement the embodiments of the present disclosure. As shown in the figure, the electronic device 300 includes a central processing unit (CPU) 301, which can perform various suitable actions and processing according to a computer program instruction stored in a read-only memory (ROM) 302 or a computer program instruction loaded from a storage unit 308 to a random access memory (RAM) 303. The RAM 303 further stores various programs and data required for operations of the electronic device 300. The CPU 301, the ROM 302, and the RAM 303 are connected to one another through a bus 304. An input/output (I/O) interface 305 is also connected to the bus 304.

A plurality of components in the electronic device 300 are connected to the I/O interface 305, including: input units 306, such as a keyboard and a mouse; output units 307, such as any type of display and speaker; the storage unit 308, such as a magnetic disk or an optical disk; and communication units 309, such as a network card, a modem, or a wireless communication transceiver. The communication units 309 allow the electronic device 300 to exchange information/data with another device through a computer network such as the Internet and/or various telecommunication networks.

The CPU 301 performs the various methods and processes described above, which are tangibly contained in a machine-readable medium, such as the storage unit 308. In some embodiments, some or all of computer programs may be loaded and/or installed on the electronic device 300 through the ROM 302 and/or the communication units 309. When the computer programs are loaded into the RAM 703 and executed by the CPU 301, one or more steps of the method described above can be performed. Alternatively, in other embodiments, the CPU 301 may be configured to perform the foregoing method by any other suitable means (for example, by means of firmware).

The functions described above in this specification may be at least partially performed by one or more hardware logic units. For example, unrestrictively, exemplary hardware logic components that can be used include: a field programmable gate array (FPGA), an application-specific integrated circuit (ASIC), application-specific standard parts (ASSP), a system on chip (SOC), a complex programmable logic device (CPLD), and the like.

Program code for implementing the method of the present disclosure may be written in any combination of one or more programming languages. The program code can be provided for a processor or a controller of a general-purpose computer, a special-purpose computer, or any other programmable data processing device, such that the program code is executed by the processor or the controller to implement functions/operations specified in the flowcharts and/or block diagrams. The program code may be executed fully on a machine, executed partially on a machine, executed partially on a machine as an independent software package and partially on a remote machine, or executed fully on a remote machine or server.

In the context of the present disclosure, the machine-readable medium may be a tangible medium that may contain or store a program used by or used in combination with an instruction execution system, apparatus or device. The machine-readable medium may be a machine-readable signal medium or a machine-readable storage medium. The machine-readable medium may be, but is not limited to, an electric, magnetic, optical, electromagnetic, infrared, or semiconductor system, apparatus or device, or any combination thereof. More specific examples of the machine-readable storage medium include: an electrical connection with one or more wires, a portable computer disk, a hard disk, a RAM, a ROM, an erasable programmable ROM (an EPROM or a flash memory), an optical fiber, a portable compact disc read-only memory (CD-ROM), an optical storage device, a magnetic storage device, or any suitable combination thereof.

In addition, although the operations are described in a specific order, it should be understood that such operations are required to be performed in the specific order or sequence shown, or that all illustrated operations shown in the figure should be performed to achieve desired results. Under given conditions, multitasking and parallel processing may be advantageous. Similarly, although several specific implementation details are included in the above discussion, these specific implementation details should not be interpreted as limiting the scope of the present disclosure. Some features described in the context of individual embodiments may also be combined and implemented in a single implementation. On the contrary, various features described in the context of a single implementation may also be implemented in a plurality of implementations separately or in any suitable combination manner.

Although the subject matter has been described in language specific to structural features and/or logical actions of the method, it should be understood that the subject matter defined in the appended claims is not limited to the specific features or actions described above. On the contrary, the specific features and actions described above are only exemplary forms of implementing the claims.

The invention claimed is:

1. A method for allocating virtual inertia in a photovoltaic cluster, comprising:
determining required virtual inertia based on a frequency change rate monitored at a grid connection point of a photovoltaic grid-connected system;
obtaining values of indexes that affect virtual inertia provided by each virtual synchronous generator (VSG) control unit in a photovoltaic cluster of the photovoltaic grid-connected system;
determining, by using a predetermined function equation, a function value corresponding to each index, wherein the function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter;
determining an allocation proportion of the required virtual inertia in each VSG control unit based on the function value corresponding to each index; and presetting a threshold of the frequency change rate, and starting virtual inertia control when the frequency change rate exceeds the threshold;
wherein the step of determining, by using a predetermined function equation, a function value corresponding to each index comprises:
determining, by using the following function equation, the function value corresponding to each index:

$$u(x) = \begin{cases} p_{10}x^2 + q_{10}x + C_{10}, a \le x \le b \\ 1, b \le x \le c \\ p_{11}x^2 + q_{11}x + C_{11}, c \le x \le d \end{cases}$$

wherein x represents the index; u(x) represents the function value; $p_{10}$, $q_{10}$, $C_{10}$, $p_{11}$, $q_{11}$, and $C_{11}$ represent determined parameters; and a, b, c, and d represent boundaries for dividing a working region of the energy storage device in a state of charge (SOC), wherein a section from a to b represents a discharging state of the energy storage device, a section from b to c represents a normal state of the energy storage device, and a section from c to d represents a charging state of the energy storage device.

2. The method for allocating virtual inertia in a photovoltaic cluster according to claim 1, wherein the obtaining values of indexes that affect virtual inertia provided by each VSG control unit in a photovoltaic cluster of the photovoltaic grid-connected system comprises:
obtaining a residual energy storage capacity of a supercapacitor, rated power of a converter, and adjustable charge and discharge power of an energy storage device for a photovoltaic unit corresponding to each VSG control unit in the photovoltaic cluster of the photovoltaic grid-connected system.

3. The method for allocating virtual inertia in a photovoltaic cluster according to claim 2, wherein
the step of determining an allocation proportion of the required virtual inertia in each VSG control unit based on the function value corresponding to each index comprises:
determining, based on a ratio of a sum of the function value corresponding to each index in each photovoltaic unit, an amount of the virtual inertia allocated to each VSG control unit.

4. The method for allocating virtual inertia in a photovoltaic cluster according to claim 3, wherein the step of determining required virtual inertia based on a frequency change rate of a photovoltaic grid-connected system comprises:
determining the required virtual inertia by using the following function:

$$F = \begin{cases} k_1 e^{df/dt + k_2} + H_0 & |df/dt| \ge M \\ H_0 & |df/dt| < M \end{cases}$$

wherein $H_0$ represents a normal inertia value, M represents the threshold of the frequency change rate, $k_1$ and $k_2$ represent control parameters, and df/dt represents a frequency change rate value.

5. The method for allocating virtual inertia in a photovoltaic cluster according to claim 4, wherein a value of the residual energy storage capacity of the supercapacitor ranges from 10% to 90%.

6. An apparatus for allocating virtual inertia in a photovoltaic cluster, comprising:
- a virtual inertia calculation module configured to determine required virtual inertia based on a frequency change rate monitored at a grid connection point of a photovoltaic grid-connected system;
- an index value calculation module configured to obtain values of indexes that affect virtual inertia provided by each virtual synchronous generator (VSG) control unit in a photovoltaic cluster of the photovoltaic grid-connected system;
- an index function value calculation module configured to determine, by using a predetermined function equation, a function value corresponding to each index, wherein the function equation is determined by constructing an objective function, determining, based on the objective function, a membership function corresponding to each VSG control unit, establishing a small-signal model of the system, analyzing stability of parameters in the membership function with a root locus analysis method, and determining an optimal parameter;
- a virtual inertia allocation module configured to determine an allocation proportion of the required virtual inertia in each VSG control unit based on the function value corresponding to each index; and
- a virtual inertia controlling module configured to preset a threshold of the frequency change rate, and start virtual inertia control when the frequency change rate exceeds the threshold;
- wherein the index function value calculation module is configured to:
- determine, by using the following function equation, the function value corresponding to each index:

$$u(x) = \begin{cases} p_{10}x^2 + q_{10}x + C_{10}, & a \le x \le b \\ 1, & b \le x \le c \\ p_{11}x^2 + q_{11}x + C_{11}, & c \le x \le d \end{cases}$$

wherein x represents the index; u(x) represents the function value; $p_{10}$, $q_{10}$, $C_{10}$, $p_{11}$, $q_{11}$, and $C_{11}$ represent determined parameters; and a, b, c, and d represent boundaries for dividing a working region of the energy storage device in a state of charge (SOC), wherein a section from a to b represents a discharging state of the energy storage device, a section from b to c represents a normal state of the energy storage device, and a section from c to d represents a charging state of the energy storage device.

7. An electronic device, comprising a memory and a processor, and a computer program stored in the memory and executable on the processor, wherein the processor is configured to implement the steps of the method as claimed in claim 1 when executing the computer program.

8. A non-transitory computer-readable storage medium, wherein the non-transitory computer-readable storage medium comprises a stored computer program, and the computer program is run to control a device on which the computer-readable storage medium is located to perform the method for allocating virtual inertia in a photovoltaic cluster according to claim 1.

9. An electronic device, comprising a memory and a processor, and a computer program stored in the memory and executable on the processor, wherein the processor is configured to implement the steps of the method as claimed in claim 2 when executing the computer program.

10. An electronic device, comprising a memory and a processor, and a computer program stored in the memory and executable on the processor, wherein the processor is configured to implement the steps of the method as claimed in claim 3 when executing the computer program.

11. An electronic device, comprising a memory and a processor, and a computer program stored in the memory and executable on the processor, wherein the processor is configured to implement the steps of the method as claimed in claim 4 when executing the computer program.

12. A non-transitory computer-readable storage medium, wherein the non-transitory computer-readable storage medium comprises a stored computer program, and the computer program is run to control a device on which the computer-readable storage medium is located to perform the method for allocating virtual inertia in a photovoltaic cluster according to claim 2.

13. A non-transitory computer-readable storage medium, wherein the non-transitory computer-readable storage medium comprises a stored computer program, and the computer program is run to control a device on which the computer-readable storage medium is located to perform the method for allocating virtual inertia in a photovoltaic cluster according to claim 3.

14. A non-transitory computer-readable storage medium, wherein the non-transitory computer-readable storage medium comprises a stored computer program, and the computer program is run to control a device on which the computer-readable storage medium is located to perform the method for allocating virtual inertia in a photovoltaic cluster according to claim 4.

\* \* \* \* \*